ELECTROSTATIC MEMORY SYSTEM

Filed Feb. 11, 1953 2 Sheets-Sheet 1

Inventor
Julian H. Bigelow
By Roland A. Anderson
Attorney

ELECTROSTATIC MEMORY SYSTEM

Filed Feb. 11, 1953 2 Sheets-Sheet 2

Inventor
Julian H. Bigelow
By Roland A. Anderson
Attorney

United States Patent Office 2,761,063

Patented Aug. 28, 1956

2,761,063

ELECTROSTATIC MEMORY SYSTEM

Julian H. Bigelow, Princeton, N. J., assignor to the United States of America as represented by the United States Atomic Energy Commission Application February 11, 1953, Serial No. 336,271

6 Claims. (Cl. 250—27)

The present invention relates to electrostatic memory systems for the storage of information, and more especially to an improved method of and apparatus for storing and recovering information on the surface of cathode ray tubes and the like.

In the electrostatic memory system of the type described by Williams in "Proceedings of Institution of Electrical Engineers," vol. 96, part 3, pp. 81–100, the beam of a cathode-ray tube is moved systematically about on a cartesian coordinate system over an array of points spaced roughly equidistant in rows and columns on the face of the tube. Isolation of the points may be achieved by operation of the beam deflection system in a manner corresponding to continuous sweeping beam motion along a row or column, accompanied by brief periodic turn-on (hereinafter called "intensification") of the beam, or by operation of the beam deflection system in a manner corresponding to discontinuous sweeping motions of the beam in the form of "jumps" from one point to another and with "dwells" accompanied by beam intensification at each such point. The array of points resulting from either technique will hereinafter be called a normal raster. A metallic mesh screen or the equivalent is attached to the outside of the face of the tube, and capacitative signals produced by the manipulation of the electron beam inside are picked up, amplified, and evaluated by especially designed circuits. The signals are, ideally, of two types: the normal event, produced by the repeated striking of an undisturbed normal raster point in exactly the same fashion upon successive occasions, and the disturbed event, produced by an intensification of the beam not exactly duplicating in each detail of the raster point position, beam intensity, and so forth, what was done during the last turn-on occasion. The success of the Williams memory depends upon keeping signals of the first type recognizably distinct from signals of the second type, so that the external circuits may know which of the two events last occurred at each raster position. With such knowledge, the system can duplicate that event after detection, store it again, and so retain memory.

Several methods for producing the disturbed event have been proposed. One popular method is to displace or "twitch" the beam from the desired raster position slightly to one side of the normal raster position while the beam is still intensified. A similar technique involves slight displacement of the beam deflection system while the beam is extinct, followed by intensification at the displaced position. Either method produces a blurring of the electrostatic charge distribution at the selected normal raster point, so that when that point is next inspected it will give a disturbed, rather than a normal pulse signal. The major problem associated with this method of producing disturbed events is that of disturbing the selected raster point to the maximum while not effecting other nearby non-related raster points not under observation. A closely related problem is that of obtaining the maximum number of raster points per unit surface area, in order to increase memory capacity without sacrificing the distinctiveness of each of the two types of signals stored.

With the knowledge of the problems and difficulties of systems heretofore proposed, the primary object of my invention is to provide an improved system for storage of information in an electrostatic memory device.

A further object of my invention is to provide the maximum number of storage positions per unit area of surface while retaining maximum differentiability between the two types of information stored in the memory.

Other objects and advantages of the method and apparatus comprising my invention will be apparent from the following detailed description thereof, when read in connection with the appended drawings, in which.

My invention involves placing the disturbed raster positions alternatively to one side and then the other of the aligned undisturbed raster points on the storage surface, rather than always to the same side of the normal raster points, usually in the direction of the beam scan, as has heretofore been done. To accomplish such storage I have provided means for recognizing the row or column, hereinafter exemplified by the term vertical column, to which the beam is directed, means for displacing the beam slightly in one direction when a disturbed signal is to be placed in any position in an odd-numbered vertical column of the raster, and means for displacing the beam slightly in the opposite direction to provide the disturbed signal in raster positions in the even-numbered vertical column.

Figure 2:
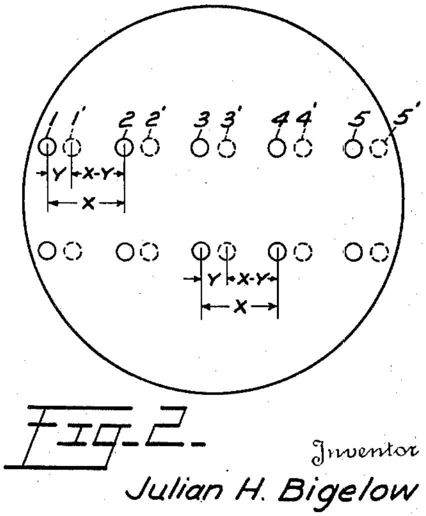
Figure 2 illustrates two horizontal rows of information stored in a geometrically regular pattern on a cathode-ray tube screen.

Referring now to Figure 2, circles 1 through 5 represent normal undisturbed raster positions, greatly enlarged for purposes of illustration, separated by a distance $x$. Dotted circles 1' through 5' represent the adjacent related positions at which the displaced beam is turned on to produce a disturbed type signal. These positions 1'–5' are displaced from the related normal raster positions 1–5 by an experimentally determined distance $y$, at which distance $y$ turn-on of the beam will produce the maximum disturbance at the related normal raster position, so that the disturbed signal which will be produced when this normal raster position is next inspected by the beam turn-on will be maximally distinct from the undisturbed type signal. It has been found in practice that the positions 1–5 may not be spaced so closely that the distance $x-y$ separating a disturbed beam position from the closest unrelated normal raster position becomes comparable to the distance $y$, or the latter point will be disturbed by the act of disturbing the nearest adjacent unrelated normal raster positions. In practice, it has been found that the separation distance $x-y$ must be substantially twice $y$ in order to provide reliable memory operation, with commercially available storage tubes.

Figure 3:
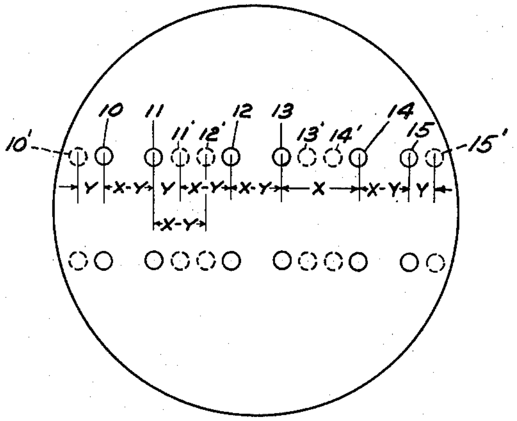
Figure 3 illustrates two horizontal rows of information stored according to my improved method.

Referring now to Figure 3, positions 10 through 15 represent the normal raster positions, while positions 10' through 15' represent the disturbed raster positions, oriented in a manner illustrative of a preferred embodiment of my invention. It may be seen that the disturbed positions are displaced alternatively to the one side and then to the other of the normal positions, rather than all in the same direction, as in Figure 2. While it may seem at first glance that no economy in space storage could be effected by such arrangement, I have found that a substantial improvement may be attained by this storage method. I have found that the requirements which must be met to preserve memory in the disturbed raster positions are peculiarly different from and more lax than those required of the undisturbed raster positions; that is, no harm is done to the memory if any of the points of the disturbed raster are disturbed by any other beam action. I have found that the disturbed points may be placed closer together than could normal raster positions without fatal interaction. Therefore I have arranged the raster so that the disturbed positions will be adjacent between certain vertical columns of positions. For example, for each even-numbered column and the preceding odd-numbered column, the disturbed positions are only $x-2y$ distance apart as are positions 12′, 11′ and this distance is just $y$ itself when $x$ is chosen equal to $3y$. Points 10 and 11 are separated by the aforesaid distance $x-y$, rather than by the greater distance $x$ as in Figure 2, distance $x-y$ having been previously indicated as the minimum separation between a disturbed and an undisturbed raster point along the line. Points 12 and 11 are separated by the distance $x$, which is greater than $x-y$, so that no interaction with the undisturbed points will be caused. It is evident that each undisturbed position is separated from the most closely adjacent related disturbed position by the distance $y$, which is the required minimal separation, and from the closest non-related disturbed position by the distance $x-y$. Normal positions 15, 14 are again separated by distance $x-y$.

It may be seen that my improved method saves a spacing of $y(H-1/2)$ or $y(H-2/2)$ or $y(H/2)$ units of distance along a raster row (where H is the number of storage locations in the row) depending on whether H is odd, or even with extremes displaced inward, or even with extremes displaced outward. Since the number H may be, for example, 40 for even a small three-inch cathode ray tube, and $y$ is substantially the spot diameter, it is seen that a considerable saving in row length for a given memory capacity is effected by my invention.

In operation of memory systems of the prior art, the electron beam regenerates the raster along successive horizontal rows from top to bottom, in the absence of a "read" or "write" instruction. As is described by Williams, supra, two stepped voltage waves are generated by memory counters actuated by clock pulses. These waves are applied respectively to the horizontal and vertical deflecting plates so as to make the beam scan the raster during an entire timed sequence. The horizontal deflecting voltage directs the beam first to a normal raster position, then the stored information is read by intensification of the beam, and utilized to set the discriminator. The beam is then turned off momentarily, a new horizontal deflection voltage is established by the next step on the voltage wave to align the beam with the disturbed position associated with that normal position, and the beam is turned on again momentarily if a "disturbed event" signal was received at the discriminator. If a "normal event" was read, however, the beam will not be turned on at the disturbed position. The next step of the deflecting voltage signal causes the beam to move to the next normal raster point in the row, and the above cycle is repeated. The beam is thus deflected intermittently in a series of "jumps," all in the same direction, across a single raster row.

It is apparent that such a unidirectional step voltage wave cannot conveniently be utilized with my arrangement of charge storage, since the beam does not progress by "jumps" directly across a row of the raster. Rather the beam progresses as follows during the regeneration scan: first normal position, backwards momentarily to the first disturbed position, forward (through the first normal position) to the second normal position, forward to the second disturbed position, forward to the third normal position and so forth, as is more fully shown in connection with Fig. 3. Therefore, in addition to a stepped voltage wave which must be applied to the horizontal deflecting plates in my novel arrangement, I also provide means for determining whether each normal raster position lies in an odd or even-numbered vertical column and means for generating a positive or negative voltage responsive thereto. I utilize that generated voltage to switch more or less current through the deflection bus resistors to modify the deflection voltages.

During a "read" operation, the address of the desired bit of information is set up in a "dispatch" counter which provides voltages for the deflection voltage generator. The beam deflection system is positioned at the correct spot before the beam is intensified; the information stored is detected by momentary beam intensification and used to open a gate in the discriminator, if a "disturbed event" is detected, but not otherwise; the twitch generator is actuated by a timed pulse displacing the beam deflection system in the desired direction as determined by the detected vertical raster column; and the beam is intensified by a pulse passing through the gate opened by the disturbed event, to rewrite such event.

In like manner, during a "write" operation, the beam deflection system is directed to the proper spot by the voltages from the address held in the dispatch counter, then the beam is intensified to read the "information" already there. The resulting signal may be compared with the one to be written, in order to select the optimum duration and intensification of the beam to best write over the previous pattern and utilized to open or close the discriminator gate. The twitch generator is then actuated by a timed pulse, moving the beam deflection system right or left from the directed spot, and the beam is intensified if a disturbed event is to be written.

Figure 1:
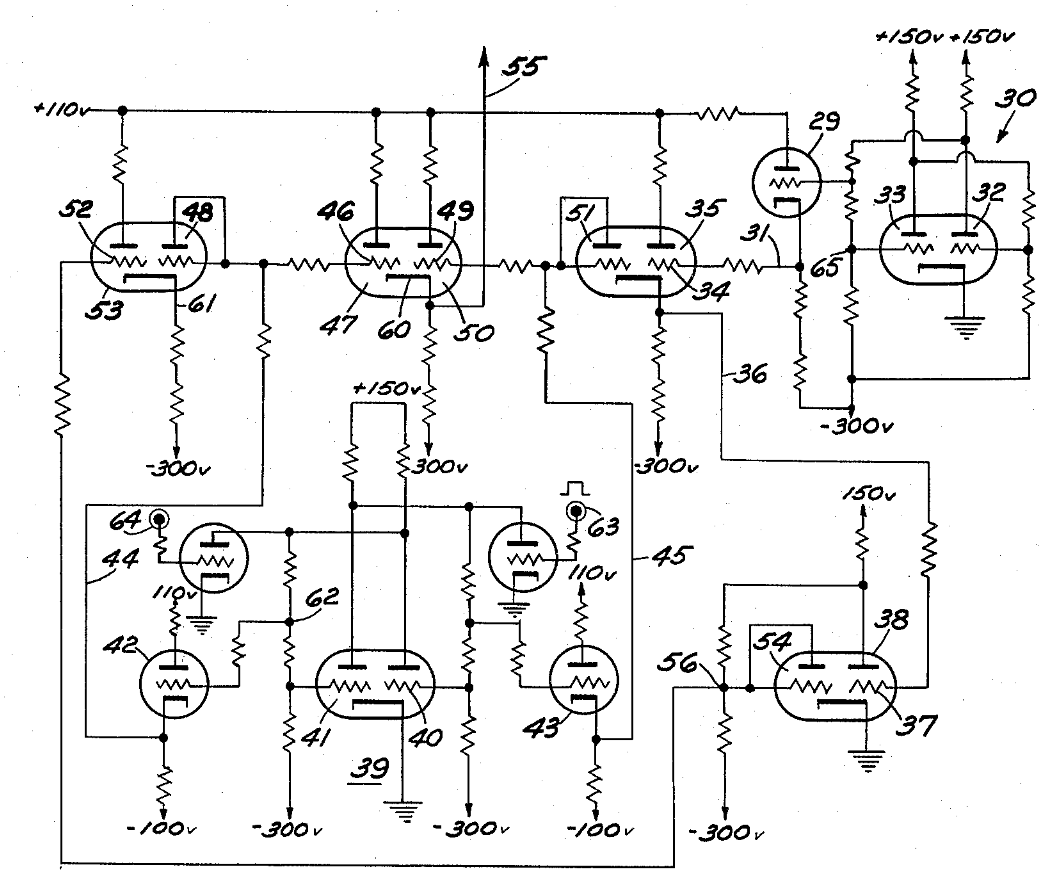
Figure 1 represents schematically an electrical circuit used to provide the alternating displacement for my improved system.

Figure 1 illustrates an accessory twitch generator circuit which is provided to alternatively displace or "twitch" the beam deflection system to the left or right depending upon the vertical column of the raster position to which the beam is directed. It will be apparent to those skilled in the art that the exact circuit arrangement will depend on the deflection generator circuits already in use to produce the normal raster positions. In a preferred embodiment, a binary counter may be provided to generate the proper deflection voltages, and an output voltage may be taken from the first counting stage which is alternately low, high, low, high, etc. as the count increases by one and the beam is stepped across a horizontal row of the raster. Associated with this output is a gate system capable of reversing the polarity of the displacement or twitch producing signal according to whether the raster position is even or odd, as indicated by the high or low voltage output.

Flip-flop circuit 30 represents the initial stage of the counter in the deflection voltage generator, and may be monitored by cathode follower 29. Output lead 31 from follower 29 varies in potential, being at substantially ground when tube 33 is conducting and at −30 volts when tube 32 is conducting. Lead 31 is connected to the control grid 34 of electron tube 35, the cathode of which is coupled through lead 36 to the control grid 37 of electron tube 38. Twitch toggle 39 may be a conventional bi-stable electric cell including electron tubes 40, 41, connected in the familiar manner. This toggle is monitored by electron tubes 42, 43. Outputs at the cathodes of the monitoring tubes will indicate the state of the toggle. The output from tube 42 is taken on lead 44 and applied to control grid 46 of electron tube 47 and also to diode-connected electron tube 48. The output from tube 43 is taken on line 45 and applied to control grid 49 of electron tube 50 and also to diode-connected electron tube 51. Grid 52 of electron tube 53, which has a common cathode with diode 48, is coupled to diode-connected electron tube 54 and also to the plate of tube 38. The twitch or displacement voltage is taken from the cathode circuit of electron tubes 47, 50, on lead 55, and applied to a stage of the deflection generator, as is more fully described hereinafter.

In operation, suppose an even-numbered vertical raster column is indicated by the voltage on lead 31, so that twitch left is called for. Tube 32 is conducting, lowering the potential at the grid and cathode of tube 29 and lead 31. Grid 34 will be at —30 volts, so that lead 36 and grid 37 will preserve that potential, so that tube 38 is cut off. The potential at point 56 will have risen until caught by diode 54 at ground, maintaining the potential on grid 52, so that tube 53 is conducting, maintaining the potential at cathode 61 at ground. In toggle 39, tube 40 is cut off, as also are both of the tubes which have their control grids coupled respectively to inputs 63 and 64, so that point 62 is at a potential at least as positive as ground, and this potential is forwarded in a cathode follower 42 and lead 44 to tube 47 which, therefore, conducts at this potential. Thus initially upon entering the even-numbered raster column, lead 55 is maintained at a potential at least as positive as ground. When a twitch is called for, a positive pulse, going in voltage from —10 to +10 then back to —10 is impressed at input 64 to flip toggle 39 to its opposite state. Lead 45 then tends to assume ground potential, but diode 51 clamps it to the —30 volt potential of lead 36, so tube 50 will not conduct at ground potential. Point 62 falls to —30 volts, causing lead 44, grid 46, and lead 55 to drop to that potential.

Next the beam deflection system is shifted to the adjacent odd-numbered vertical raster column, causing flip-flop circuit 30 to flip to the opposite state, so that tube 33 will conduct, raising the potential at point 65 and lead 31 to substantially ground. Lead 36 will assume that potential, causing tube 38 to conduct, lowering point 56 to —30 volts, and dropping cathode 61 to —30 volts. Grid 46 is clamped at —30 volts by diode 48, so lead 55 will also assume that potential so long as lead 45, being at —30 volts due to conduction of tube 41, holds grid 49 at that potential. A second pulse is then applied to toggle 39, this time through input 63, flipping the toggle back to its original state, raising lead 44, grid 46, and lead 55 back to ground potential. Thus the twitch cycle has produced at out-put 55 a fall of potential, causing a twitch left, when the even-numbered raster row was indicated by the signal on lead 31, while in contrast it produced a rise in potential, causing a twitch right, when the odd-numbered raster row was indicated.

It is apparent, therefore, that the polarity of the output pulse on lead 55 depends upon the state of flip-flop 30. As this counter indicates odd or even raster position, the displacing voltage will be positive or negative to displace the beam right or left as is desired. It is apparent also that the displacement voltage (provided by this circuit exemplification) resides at initially opposite polarities in the beginning of the routine process at each storage location, depending upon whether said location lies in an even or odd raster column; and that this fact automatically produces the type of normal raster spacing illustrated in Fig. 3, when the circuit of Fig. 1 is properly adjoined to circuits producing the normal raster of Fig. 2.

Figure 4:
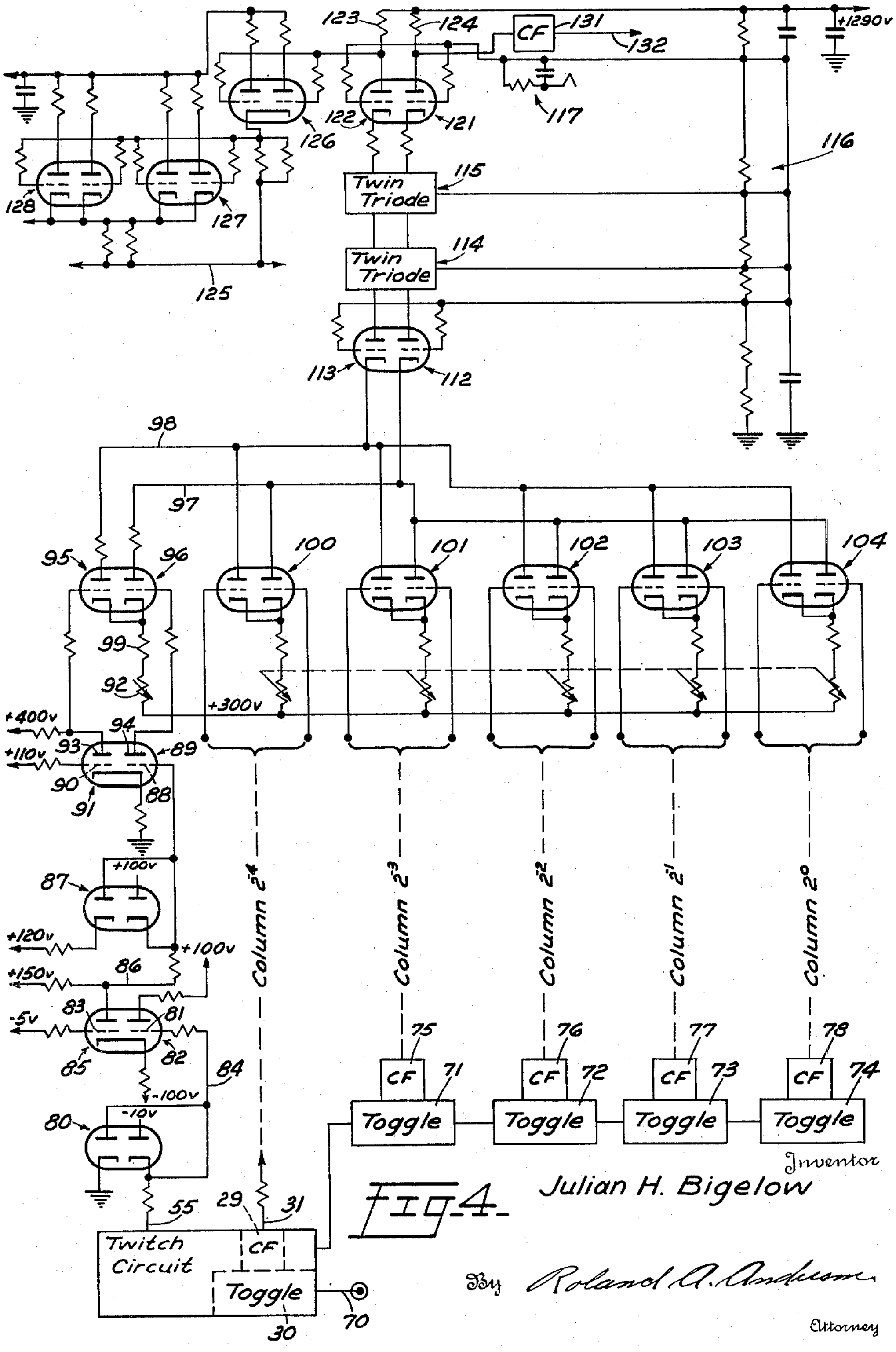
Figure 4 represents schematically a raster deflection circuit for deriving basic deflection voltage signals from a binary address, and incorporating the displacement or twitch circuit of Fig. 1.

A deflection generator suitable for use with my novel displacement system, but not my sole invention, is shown in Fig. 4. The blocks labelled "Toggle" represent the stages of a binary storage register, and may be Eccles-Jordan trigger pairs such as circuit 30, Figure 1, connected in cascade as in conventional scalers. Repetitive pulses from an oscillator or clock pulse generator or other external controlling circuitry are fed to input 70 and trigger the toggles in sequence in the usual manner. The toggles represent "0" in one stable state and "1" in the other stable state, so that at any instant, the register contains, for example, five binary digits known as the horizontal address. The address of a bit of stored information consists of two binary numbers which specify the horizontal and vertical coordinates of a normal raster position to which the electron beam in the storage tubes are to be directed. Toggles 30, 71–74 contain the horizontal deflection address, while a similar register of, for example, five toggles, not shown, may contain the vertical deflection address.

The states of the various toggles determine the voltage levels at associated monitoring cathode followers indicated "CF," which may be identical with tube 29, Figure 1, and connected to the toggles as tube 29 is coupled to toggle 30. The signal voltage level derived from each toggle determines which of two corresponding tubes draws current. These two corresponding tubes are connected to two summing busses such as 97, 98 of Fig. 4 and thence through current conserving relay tubes and finally through separate resistors to a source of fixed potential and also to the deflecting plates of the storage tube. The voltage drop across the resistors therefore controls beam deflection. The twitch voltage generator is treated as a typical separate stage, of lower order than column 2—4, and drawing current from the same summing busses.

Since the circuits connected to each toggle may be of identical form, for simplicity only one stage is shown in complete detail. Toggle 30 is monitored by cathode-follower 29, so that the voltage level at lead 31 is determined by the state of the toggle. Similar cathode followers 75—78 couple each of the other toggles to respective diode clippers like circuit 80. To minimize noise variations, the clippers 80 restrict the voltage swing at lead 55 to one from 0 to —10 volts. The signal on lead 84 is coupled to grid 81 of triode 82, the grid 83 being held at —5 volts. When lead 84 is at —10 volts, tube 85 will conduct, but when lead 84 rises to 0 volts, tube 82 conducts and tube 85 is cut off. The signal on lead 86 thus varies from +150 volts when tube 85 is non-conducting to approximately 90 volts when that tube conducts. The voltage swing is restricted by twin-diodes 87 at +120 volts and +100 volts, and applied to grid 88 of tube 89, grid 90 of coupled tube 91 being held at +110 volts. Triode 91 will conduct when grid 88 is at +100 volts, while triode 89 conducts when grid 88 is at +120 volts. The voltages at the plates 93, 94 depend on which tube conducts, and determine which half of duo-triodes 95, 96 conducts. The latter tubes are connected to summing busses 98, 97, and will draw a current $$I=\frac{100}{R}$$

from one bus or the other, where R is the value of the cathode resistance, including fixed resistor 99 and adjustable resistor 92; and 100 volts is impressed across R.

The cathode resistances of each of tubes 95, 96, 100—104 are so chosen that tube 104 draws, for example, $i_0=6.98$ *ma*; tube 103 draws $i_1=\frac{1}{2}i_0$; tube 102 draws $i_2=\frac{1}{4}i_0$; etc., so that the current in each successive column is reduced by a factor of 2. Suitable values of resistances are: tube 104, 14,400 ohms; tube 103, 29,000 ohms; tube 102, 57,000 ohms; tube 101, 115,000 ohms; tube 100, 231,000 ohms, and tube 99, 39,000 ohms; with potentiometer 92 having 500,000 ohms resistance. The currents drawn are added in the summing busses 97, 98, and ultimately caused to flow through a resistor to develop a voltage proportional to the binary number used as input to the generator. The cathode resistances of each of the tubes in five vertical deflection columns, not shown, but which may be identical in form with columns $2^0$—$2^{-4}$, are likewise chosen so that in each successive stage the current is reduced by a factor of 2. The currents from tubes in the vertical deflection columns are in like manner added in summing busses.

To make the currents available at a higher voltage level for deflection of the electron beam, respective series circuits, each comprising, for example, four triodes, are connected to each of the summing busses. Only those in the horizontal address system are shown, since the series triodes of the vertical deflection system may be identical. The cathodes of tubes 112—113 are coupled to the busses, while the grid voltages are held at selected values by divider network 116 connected across the high voltage supply. Parallel R-C circuits similar to circuit 117 are coupled between the points feeding the grids and heaters of the series-connected triodes to hold the heaters at the D. C. level of the grids, so that the potential between each cathode and its heater will be small. The triodes 121—122 are coupled to the high voltage bus through separate resistors through which flow the summing bus currents. The voltage drops across these resistors 123—124 are the desired deflection voltages, and are coupled to the deflection busses 125, 132 through respective cathode follower networks to provide low impedance driving sources for the large capacity of those busses. Only one network is shown in detail, and includes tubes 126—128. The corresponding network 131 may be identical. The two horizontal and two vertical deflection busses are coupled respectively to the four deflecting plates of the cathode-ray storage tubes. If a parallel array of tubes is used, the busses may connect to each in parallel.

As was described in connection with Fig. 1, when the address indicates an even-numbered vertical raster row, lead 55 is at 0 volts, lead 84 is at 0 volts, tube 82 conducts, tube 85 is cut off, lead 86 is at +120 volts, tube 89 conducts, and tube 95 conducts, drawing current from bus 98, through the series triodes and resistor 123. When lead 55 is driven negative by the twitch signal, lead 84 assumes a potential of −10 volts, triode 85 conducts, lead 86 falls to +100 volts, triode 89 is cut off, triode 91 conducts, triode 95 is cut off, and tube 96 conducts, drawing current from bus 97 through the series triodes and resistor 124. Therefore, less current flows through resistor 123 and more flows through resistor 124, so that the deflection voltage on bus 125 is increased, while that on bus 132 is decreased, and the electron beam is deflected accordingly to the left a predetermined distance. In like manner, a positive change on lead 55 causes the beam to be twitched right, as is desired in my improved system.

What is claimed is:

1. In an electrostatic memory system of the surface-redistribution type, including an information storage surface, means for forming a monitoring electron beam, an address counter comprising a plurality of bistable stages, and means for deflecting said beam about said surface to a raster of aligned rows of separated points responsive to said address, improved means for producing a disturbed charge pattern on any of the desired raster points comprising means for deriving a binary output from one of said stages, means coupled to said deflecting means and said one stage output for deflecting said beam in one direction or the other along a row responsive to the binary character of said stage output.

2. In an electrostatic memory system of the surface-redistribution type including an information storage surface and a monitoring electron beam, means for directing said electron beam at said surface, and means for positioning said beam upon a plurality of aligned normal points upon said surface, the improvement comprising mean for spacing said normal points along a row at irregular intervals differing by a controllable distance from a geometrically regular spaced raster so that said points along a row are separated by alternating wide and narrow intervals, and means for producing disturbed points necessary to reverse the signal stored at said aligned points within the wider intervals only, said normal and disturbed points being so arranged that for any choice of said distance alternate normal points and their related disturbed points form a pair symmetric about corresponding alternate points on said geometrically regular-spaced raster, and intermediate alternate normal points coincide with corresponding points on said regular-spaced raster.

3. In an electrostatic memory system of the storage-redistribution type including a storage surface, means for directing an electron beam at said surface, an address counter comprising a plurality of bistable stages, and means for deflecting said beam to a plurality of aligned positions responsive to said address, said positions forming a normal raster on said surface, the improvement which comprises means responsive to one of said counter stages for producing alternatively a first or a second voltage, and means for coupling said produced voltages to said beam deflecting means for modifying the signal supplied to said beam deflection means to displace said beam in one of two alternative, opposite directions according as said first or said second voltage is produced.

4. In apparatus of the character described, having a deflection generating system including a binary counter, comprising a plurality of binary stages, and means for producing and deflecting an electron beam through $n$ positions in an aligned raster row including means for impressing $n$ pulses on the input to said counter, means for deriving an output voltage from the first stage of said counter, which voltage alternately assumes one of two values, as each pulse is received, means for generating a control voltage corresponding to the assumed value of said output voltage, means coupled to said beam deflecting means for temporarily modifying said deflection voltage to deflect said beam away from one of said raster positions, and circuit means coupled to said modifying means for determining the direction of said temporary beam deflection responsive to the binary character of said control voltage.

5. In apparatus of the character described a binary counter, means for deriving an output from said counter, a bistable electric circuit, means for deriving opposite binary signals from the respective tubes of said circuit, a current switching device comprising a pair of electron tubes each having an anode, a control grid, and having a common cathode, means for deriving an output signal from said cathode, means for applying said derived voltages to respective control grids, first, second, third, fourth, and fifth electron tubes having anode, cathode, and conrol grid elements, a plurality of diode clamp elements having respective cathodes in common with each of said third, fourth, and fifth electron tubes, the anode of said first clamp being coupled to the grid of said second tube, the anode of said second clamp being coupled to the grid of said fifth tube, and the anode of said third clamp being coupled to the grid of said first tube, means coupling the output of said counter to the grid of said third tube, means for deriving an output signal from said third tube and coupling said output signal to the grid of said fourth tube, means for deriving a signal from said fourth tube and coupling said signal to the grid of said fifth tube, whereby the polarity of the signal produced by said current switching device is determined by the binary output of said counter.

6. A binary voltage generating circuit comprising: a first discharge device provided with first and second current paths, first and second control electrodes in respective paths, and an output; a bistable circuit provided with an input for receiving a control signal and an output which assumes alternately one of two voltage levels; a bistable toggle circuit, means for actuating said toggle from either stable state to the opposite state, and first and second toggle outputs coupled to said first and second control electrodes; first and second clamp circuits each provided with a first electrode coupled to a corresponding control electrode, a second electrode, and means for changing the clamp voltage level comprising a second discharge device having a cathode coupled to said second electrode, an anode, and a grid, means for impressing a control voltage on said grid to control the potential of said second electrode; and means coupling said bistable circuit output to said grid in each of said clamp circuits to provide said control voltage therefor.

References Cited in the file of this patent

UNITED STATES PATENTS

| | | |
|---|---|---|
| 2,422,295 | Eaton | June 17, 1947 |
| 2,482,759 | Goodrich et al. | Sept. 25, 1949 |
| 2,564,908 | Kuchinsky | Aug. 21, 1951 |
| 2,599,949 | Skellett | June 10, 1952 |
| 2,615,127 | Edwards | Oct. 21, 1952 |
| 2,644,037 | Beaufoy | June 30, 1953 |
| 2,660,669 | West | Nov. 24, 1953 |